United States Patent [19]

Siciliano

[11] 4,195,592
[45] Apr. 1, 1980

[54] POULTRY CAGE SYSTEM

[75] Inventor: Anthony J. Siciliano, South Lyon, Mich.

[73] Assignee: Diamond International Corporation, New York, N.Y.

[21] Appl. No.: 872,036

[22] Filed: Jan. 25, 1978

[51] Int. Cl.² ............................................. A01K 31/06
[52] U.S. Cl. ........................................ 119/17; 119/18
[58] Field of Search ...................... 119/17, 18, 22, 48; 403/242, 254, 230

[56] References Cited

U.S. PATENT DOCUMENTS

| 3,274,972 | 9/1966 | Keen et al. | 119/48 |
| 3,601,432 | 8/1971 | Fenwick et al. | 403/230 |
| 3,768,442 | 10/1973 | Van Huis | 119/22 |
| 3,867,047 | 2/1975 | Wightman et al. | 403/242 |

Primary Examiner—Hugh R. Chamblee
Attorney, Agent, or Firm—Kenyon & Kenyon

[57] ABSTRACT

An easily assembled poultry cage system wherein the framework for the system includes a plurality of spaced A-frame members all of which are adapted to be assembled without the use of conventional fasteners. Protrusions and complementary receptacles are utilized for joining, connecting and interconnecting parts of the system. Once assembled into the appropriate receptacle, the protruding member is deformed in a manner to securely fasten the respective members together. The cages are supported between A-frame members by means of wire supports secured to the A-frames, by interconnection of the cages and by means of the feed trough. The feed trough is supported by a clip member in which it is secured by a snap-fit to the spaced A-frame members.

13 Claims, 8 Drawing Figures

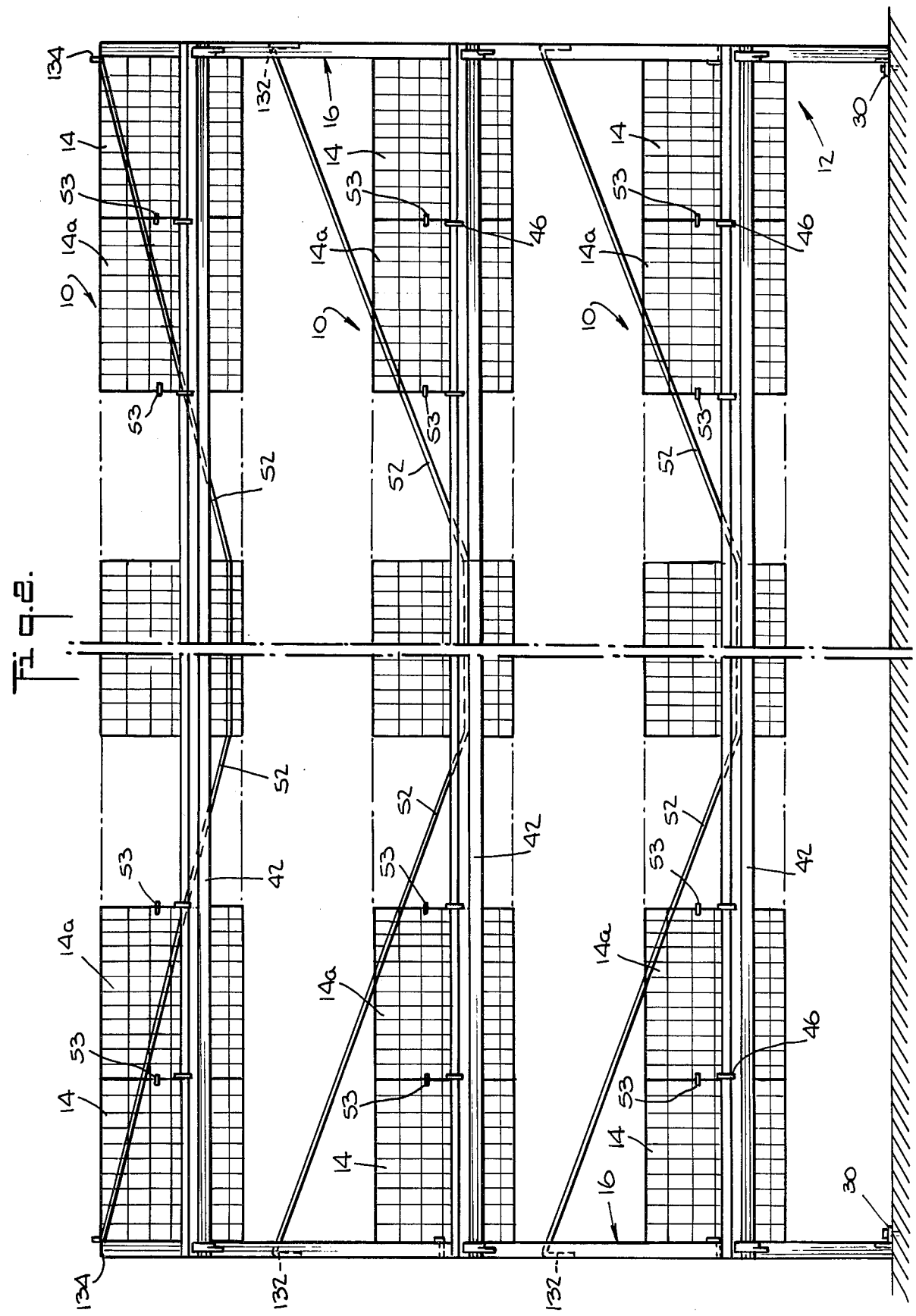

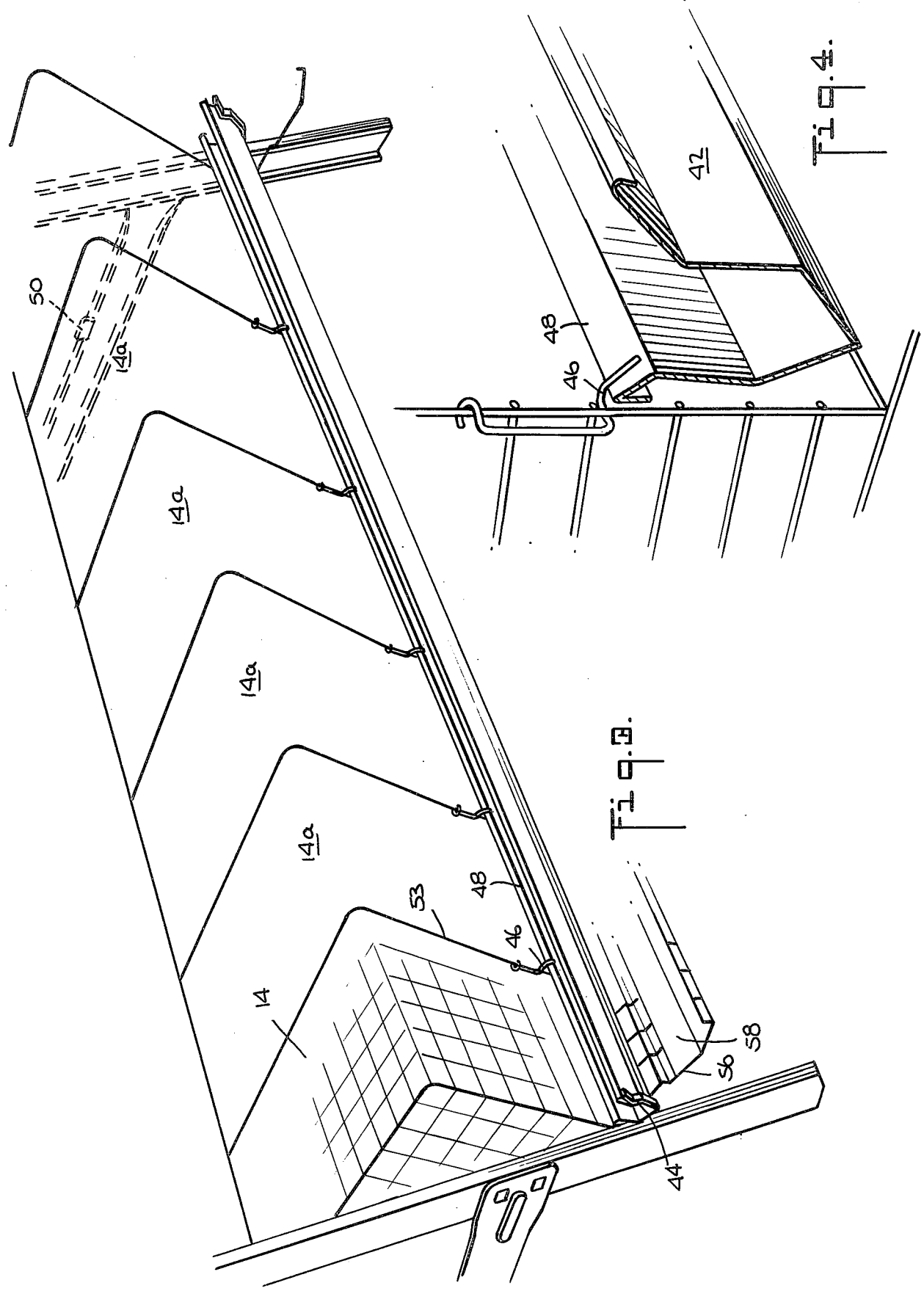

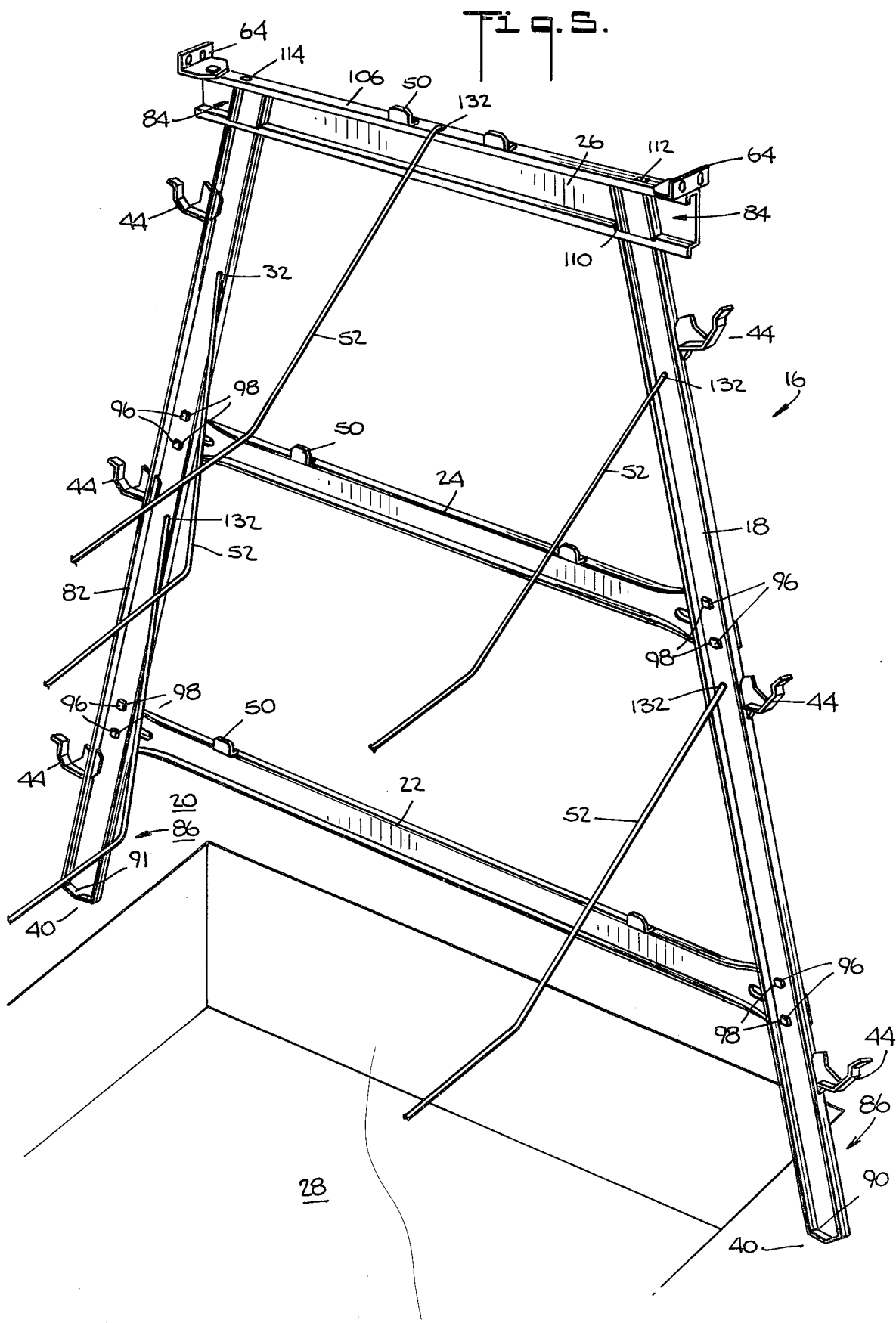

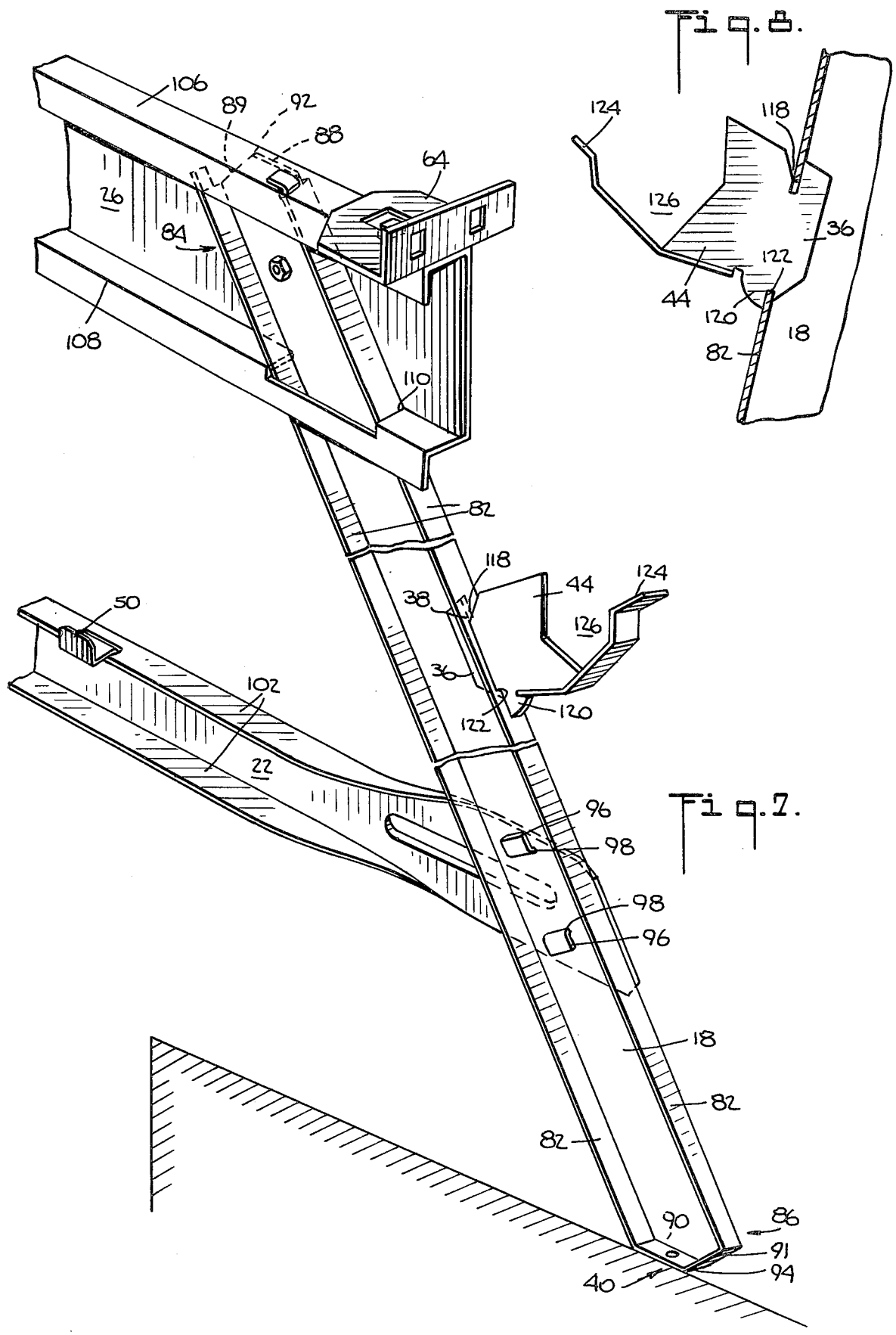

POULTRY CAGE SYSTEM

BACKGROUND OF THE INVENTION

The present invention relates generally to poultry cage systems and more particularly to a framework for such systems that may be readily and securely assembled without the use of conventional welding, screws, nuts, bolts, rivets and like fasteners.

Poultry cage systems or batteries including rows of juxtaposed cages are currently utilized in the poultry industry. Some of these systems are illustrated in U.S. Pat. Nos. 3,274,972 and 3,492,971 issued to Keen and Siciliano.

Systems such as those currently in use include several rows of cages which in some instances extend for 600 feet or more. Along this distance, by necessity, are provided a large number for spaced apart support members. These members when installed are generally assembled along with the cages on the site of ultimate use, i.e., the chicken farm. The required assembly entails assemblage of the support members, erection of the cages, support of the cages etc. All of this requires substantial efforts and time and in some instances results in improper and inadequate support necessary for the cage members.

By the means disclosed herein, a framework for a poultry cage system is provided which is sturdy and which may readily be assembled at the installation site.

SUMMARY OF THE INVENTION

It is an object of the present invention to provide a poultry cage system which is quickly, easily and securely assembled.

It is another object of the present invention to provide a poultry cage system which may be assembled without welding and substantially without the use of conventional screws, nuts, bolts, rivets and like fasteners.

It is still another object of the present invention to provide a framework for a poultry cage system including a plurality of A-frame members which are quickly, easily and securely assembled without welding and the use of conventional screws, nuts, bolts and like fasteners.

These and other objects are achieved by joining, connecting and interconnecting individual framework members, cages, supports therefor and other members in the cage system by locking means which are secured to the respective members or to mounting brackets therefor. The locking means are generally in the form of a protruding member and a complementary receptacle for receiving such member. The protrusion which includes an engaging means, is inserted into the appropriate receptacle and is secured therein, for instance by deforming the protrusion in such a manner to secure the deformed protrusion and area surrounding the receptacle into a locking relation.

In accordance with the disclosed embodiments of the invention, the cage system includes a plurality of A-frame members which are interconnected to suspend rows of cages therebetween by means of longitudinal supports and the cages themselves. The cages are supported by support wires secured to the A-frames which engage the cages disposed adjacent the cross-members of the A-frame. Further support for the cages is provided by interconnection of juxtaposed cages and by connection of the cages to a longitudinal support member.

In the preferred embodiment, longitudinal support is provided by way of a feed trough, with the legs and cross-members of the A-frame being connected and interconnected by means of a protrusion extending through a receptacle and more particularly, one protrusion is inserted through the hole and bent to secure the protrusion and the respective members. The feed trough in the preferred embodiment is secured to adjacent A-frame members by snap fitting thereof into brackets or clips which are secured to the A-frame again utilizing a receptacle and projection arrangement. More specifically, the projection includes a notch at one end and a finger at the opposed end, the projection being inserted into a slot with the notch and finger engaging the ends of the slot.

These and other aspects of the invention will be more apparent from the following description of the preferred embodiment thereof when considered with the accompanying drawings and appended claims.

BRIEF DESCRIPTION OF THE DRAWINGS

The present invention is illustrated by way of example and not limitation in the figures of the accompanying drawings in which like references indicate similar parts and in which:

FIG. 2 is a side elevation view of cage batteries of the cage system of FIG. 1 with the center of the system broken away;

FIG. 3 is a perspective view of the lowermost cage row of the cage system of FIG. 1 depicting interconnection of the cages and the feed trough;

FIG. 4 is an enlarged perspective view of a portion of the cages depicted in FIG. 3 and the connection thereof to the feed trough;

FIG. 5 is a perspective view of an A-frame support member according to the present invention depicting the cage support wires, feed trough support brackets and feed supply support brackets;

FIG. 7 is an enlarged perspective view of a portion of the assembled A-frame member of FIG. 6; and FIG. 8 is a fragmentary cross-sectional view of the feed trough support bracket mounted on a leg of the A-frame member depicted in FIG. 7.

DESCRIPTION OF THE PREFERRED EMBODIMENT

Figure 1:
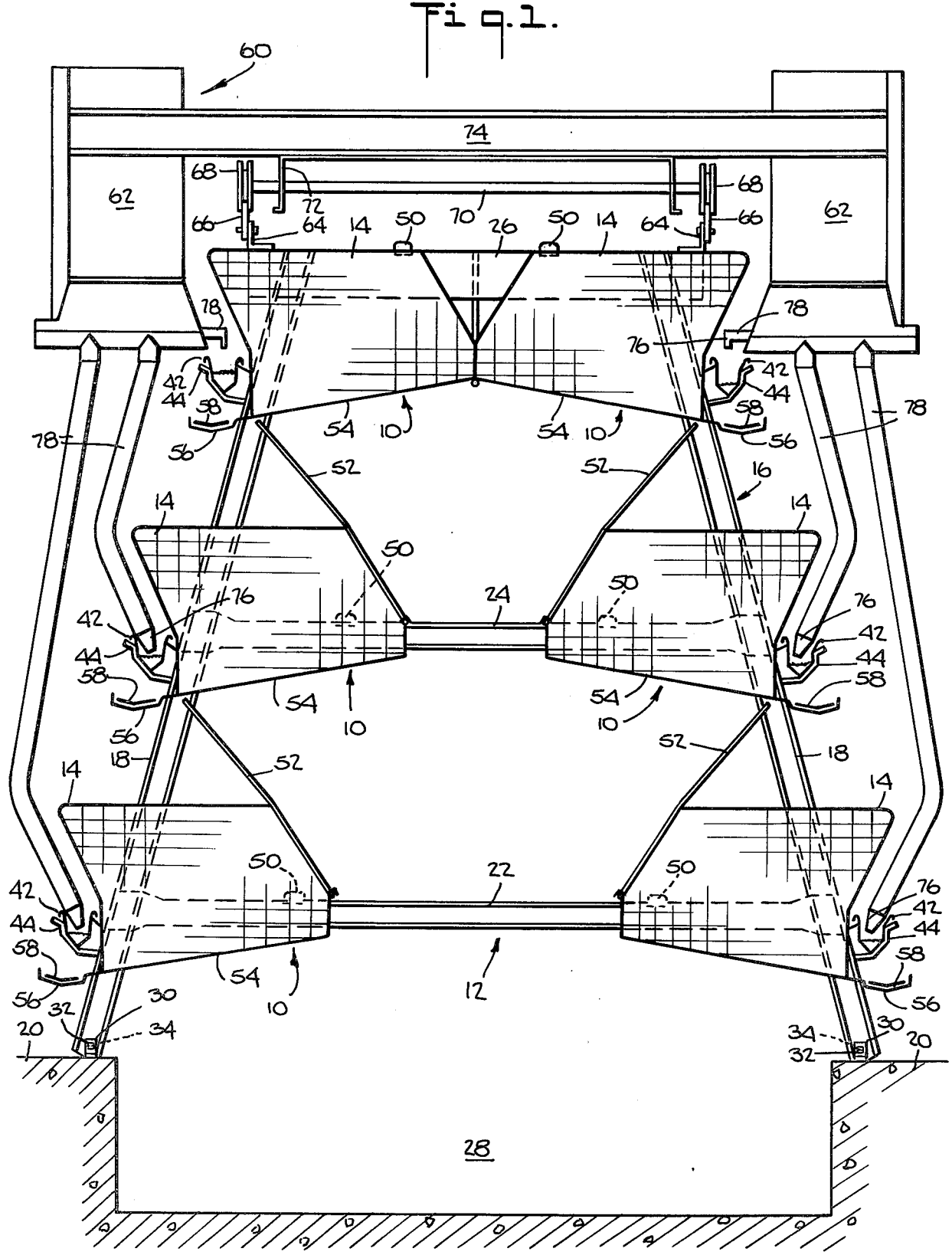
FIG. 1 is an end elevation view of a layer cage system according to the present invention.
Figure 6:
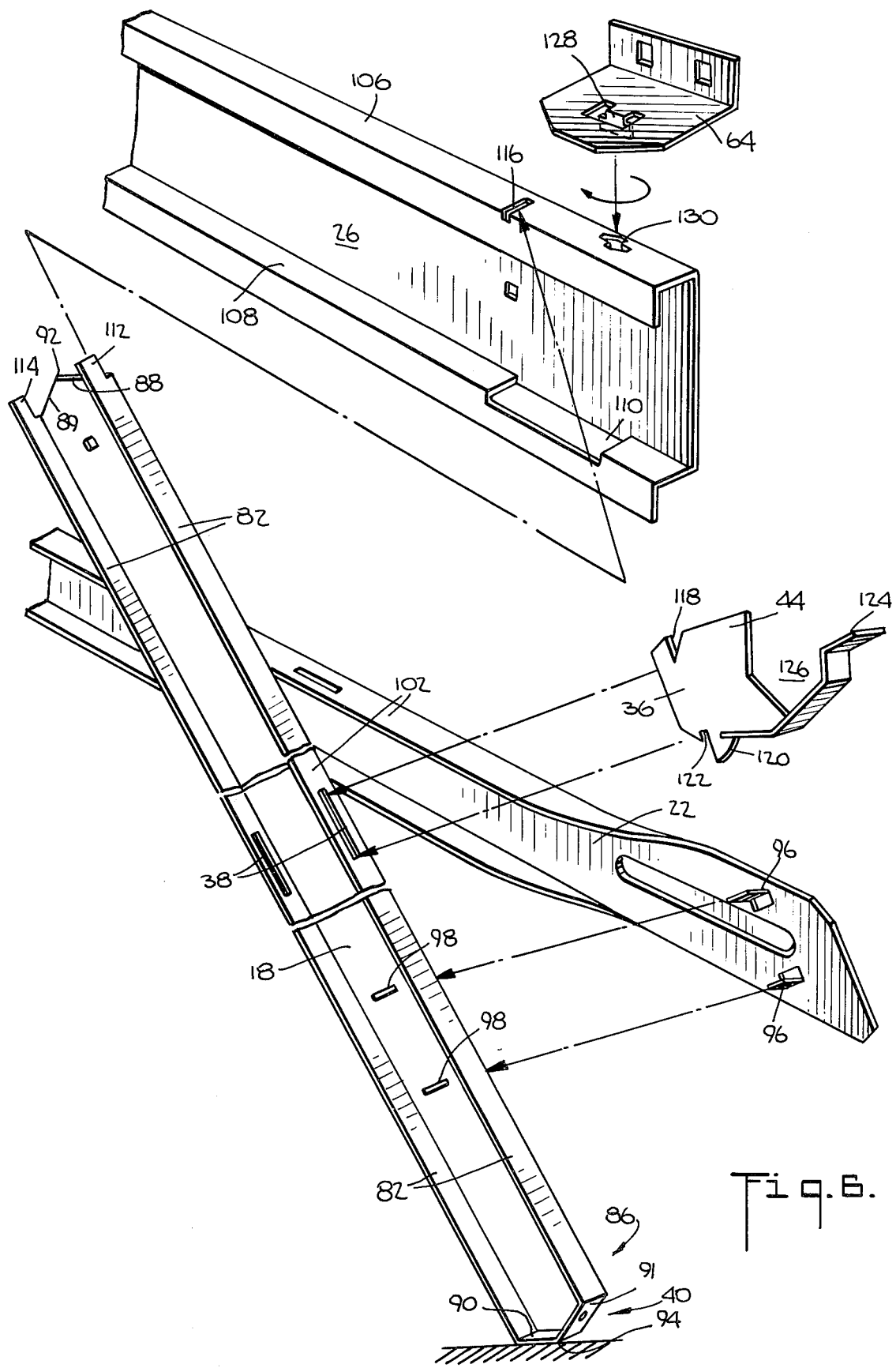
FIG. 6 is an exploded perspective view of a portion of the A-frame member of FIG. 5 depicting the manner of connection of the cross-members, legs and brackets thereof.

Referring now more particularly to the drawings, a battery or system of chicken laying cages is illustrated. FIGS. 1 and 2 depict the assembled laying cages and includes a plurality of cage rows 10 mounted on a framework reference generally as 12. Each row of cages 10 includes a plurality of juxtaposed cages 14 and 14a suspended between the A-frame members 16 of the supporting framework. The A-frame is formed with opposed legs 18 which are vertically oriented and inclined towards each other and a plurality of cross-members 22, 24 and 26 interconnecting the legs. The base of the legs 18 rest on the floor surface 20. The cages extend between adjacent A-frames 16 and are mounted thereto adjacent cross-members 22, 24 & 26. The legs of the A-frame may be disposed as illustrated to straddle a trough 28 in the floor and are secured to the floor surface 20 by L-shaped brackets 30. One end of bracket 30 is connected to the A-frame leg 18 by a projection 32 extending from the bracket through a slot 34 in the leg with the projection 32 being bent back over the slot into a locking arrangement. The other end of the bracket is bolted to the floor. Alternatively, the projection 32 may be twisted, or a projection 36 and slot 38 such as those shown in FIGS. 6-8 may be used. Additionally, legs 18 may be bolted directly to the floor through flanges 40 as shown in FIGS. 6 and 7.

The A-frames 16 are interconnected to one another by feed troughs 42 which are secured to respective legs of each A-frame by clip members or brackets 44. Each intermediate cage 14a is additionally secured to trough 42 by a wire or clip 46 wrapped or fastened to the cage and hooked to a lip 48 on trough 42 (FIGS. 3 and 4). The cages 14 immediately adjacent an A-frame 16 are supported thereon by projections or ears 50 extending from respective cross-members 22, 24, 26 onto which the cage is hooked. The cages are also supported by support wires 52 secured to and extending between respective legs of adjacently spaced A-frames 16, the cage disposed at the approximate center between A-frames 16 being engaged by the wire supports 52 (FIG. 2). Additional support to the cages is provided by interconnection of the cages with wires 53.

Each of the cages includes a sloping wire floor 54 terminating in an extension 56 forwardly projecting beneath the feed trough 42. Extension 56 is suitable for receiving and supporting a conveyor belt 58 which is operated from time to time to remove eggs laid by the birds. The eggs roll along the wire floor and out onto the conveyor belt disposed on extension 56.

Feed is supplied to the feed troughs by feed system 60 which includes traveling hoppers 62 supported on the A-frames 16. Brackets 64 are secured to the top of the A-frame 16 and tracks 66 are fastened to the brackets. Flanged wheels 68 interconnected by an axle 70 run along the tracks, the hoppers being supported on the axle by bracket 72 and beam 74. The hoppers are filled by a fill system (not shown) located at the end of the cage battery and travel along the cage rows discharging feed in a thin layer into the troughs through nozzles 76 disposed at the end of hoses 78.

Referring now to FIGS. 5-8, A-frame 16 includes opposed legs 18 which, in the embodiment shown in FIG. 5, are fastened directly to the floor surface 20. Legs 18 are vertically disposed and inclined towards each other and are interconnected by cross-members 22, 24 and 26. Each of the legs is identical and are thus readily interchangeable. Each leg 18 includes flanges 82 extending along each side of the leg for the length of the leg. The top 84 and bottom 86 of each leg are V-shaped (FIGS. 6 and 7) having upper ends 88 and 89 and flanged lower ends 90 and 91, respectively. The top and bottom of the leg terminates in an upper and lower apex 92, 94, respectively. The cross-members 22, 24 and 26 and legs 18 are fastened to one another by means of a protrusion and complementary receptacle arrangement. Lower cross-members 22 and 24 have rectangular projections 96 extending from the ends thereof, the projections being formed from a cut-out portion of the cross-member. The projections extend through slotted holes 98 in the legs and the cross-members and legs are interlocked by bending the projections sufficiently to provide a locking relation between the members (FIG. 7).

Each of the cross-members 22, 24 includes flanges 100, 102 extending along the sides thereof and which terminate before the projections 96, the surface of the cross-members at the ends thereof being planar except for the projections whereby the cross-members at the ends abut flushy against the legs.

The upper cross-member 26 includes flanges 106 and 108 extending along the sides thereof for the length of the cross-member. Slotted openings 110 are provided adjacent the ends of cross-member 26 in the lower flange 108. The length and width of the slotted opening 110 is slightly larger than the corresponding length and width of the transverse cross-section of the leg 18 whereby a leg may be inserted through the slotted opening. Each of the flanges 82 of legs 18 terminates at the upper end thereof with an extending projection 112 and 114. Projections 112 and 114 terminate adjacent the apex 92 of the V-shaped end of the leg 18. The right leg, as depicted in FIG. 7, is inserted through slotted opening 110 with the end 88 abutting against the upper flange 106 of cross-member 26 and projection 112 extending through hole 116 in the upper flange 106. The projection 112 is bent to interlock the leg and the upper cross-member 26 at the right side thereof. The left leg similarly extends through opening 110 at the left end of the lower flange 108 of the upper cross-member 26 with end 89 abutting against the upper flange member and projection 114 extending through hole 116 in the upper flange 106 at the left end thereof. Projection 114 is bent to interlock the upper cross-member 26 and the left leg. The legs are secured to the floor through holes provided in ends 90 and 91 of flange 40, the right leg (FIG. 6) being secured through end 90 and the left leg through end 91.

The members of the A-frame are thereby securely interlocked solely by means of protrusions and complementary receptacles. Thus, screws, nuts, bolts, rivets and similar conventional type fasteners are not required to assemble the A-frames and erect the poultry cage system of this invention.

As mentioned hereinbefore, adjacent pairs of A-frames are coupled to one another by the feed troughs 42. The feed troughs are supported in brackets or clips 44 secured to the legs of the A-frame by a projection 36 extending through a slotted opening 38 in the outside flange of a respective leg (the right side flange in FIG. 6). The projection 36 includes a V-shaped notch 118 at the top thereof and a finger 120 adjacent the bottom thereof. Another notch 122 is provided between the bottom of the projection 36 and the finger 120. Bracket 44 is secured in slot 38 by engagement of the V-shaped notch 118 at the top of the slot and at the bottom of the slot by engagement of the notch 122 and finger 120 bearing against the outside of the respective flange 82. The weight of the clip 44 and trough 42 tends to pivot the clip to engage the finger 120 and notches 118, 122 in the slot. No deformation or bending of projection 36 is required to secure a clip 44 on leg 18. The clips include a partially flexible extension 124 with the opening 126 formed by the extension and the clip conforming substantially to the transverse cross-section of the feed trough 42, although it is slightly smaller. The feed trough is thus secured in the clips by a snap-fit.

As described hereinbefore, brackets 64 are used to connect the feed supply system to the cage system. Each bracket 64 is L-shaped and includes a T-shaped projection 128 extending from one arm of the L-shaped bracket (FIG. 6). The upper flange 106 adjacent the ends thereof is provided with shaped openings 130 therein which receive therethrough the projection 128. Bracket 64 is locked to the upper support member by rotating the bracket with the projection 128 locking in the shaped receptacle. The track 66 is fastened to the other arm of the L-shaped bracket as described hereinbefore.

As described briefly hereinabove, the cages are suspended between adjacent pairs of A-frames 16 by the wire supports 52, engagement of the end cages by ears 50 on the cross-members, interconnection of the cages themselves and connection of the cages to the feed troughs 42 (FIGS. 2–4). The wire supports 52 have ends extending through holes 132 in the legs of the A-frame and holes 134 in the upper flange 106 of the upper cross-member 26 (FIG. 5). Thus, the wire supports 52 are secured to the A-frame by the end of the wire itself. The wire supports are secured to the legs and support cross-member by bending the ends thereof in the respective holes. The support wires for supporting the lower two rows of the cage system extend from the legs of adjacent pairs of A-frames at a location above the cages to a location adjacent the bottom of the center cages (FIG. 2). The support wires supporting the upper row of cages extends from the upper cross-members of adjacent pairs of A-frames at a location adjacent the top of the cages to a location below the center cages (FIG. 2). By means of the ears 50, feed trough 42, connection of each cage to the feed trough, wire supports 52 and interconnection of the cages, an interlocking and mutually supporting structure is obtained for the cages between the A-frames without welding or the use of conventional screws, nuts, bolts, rivets and such fasteners.

The advantages of the present invention, as well as certain changes and modifications of the disclosed embodiments thereof, will be readily apparent to those skilled in the art. It is the applicants' intention to cover by their claims all those changes and modifications which could be made to the embodiments of the invention herein chosen for the purpose of the disclosure without departing from the spirit and scope of the invention.

What is claimed is:

1. A poultry cage system comprising a plurality of spaced frame members, means interconnecting said frame members to one another, a plurality of rows of cages for housing said poultry extending between said frame members and means for supporting the cages from said frame members, said frame members each including a pair of upright legs, an upper cross-member and at least one lower cross member extending between and connected to said legs, said upper cross-member being connected to said legs proximate the tops thereof and including a longitudinally-extending upper flange on the upper side thereof and a longitudinally-extending lower flange on the lower side thereof, said lower flange of the upper cross-member having an opening adjacent each end thereof of a size adapted to receive and embrace one end of each of said legs on each side thereof, each of said legs being positioned with one end thereof passing through said opening to facilitate an abutting relation against the lower side of said upper flange, and locking means for securely connecting said cross-members and legs to form said frame, said locking means including a protrusion extending from surface of one of said members and a complementary receptacle in the other of said members for receiving said protrusion in a locking relation when said protrusion is inserted therein after assembly.

2. The poultry cage system recited in claim 1, wherein each of said frame members includes a pair of legs and said legs of said frame members are inclined toward each other and said cross-members are horizontally disposed to form an A-shaped frame member.

3. A poultry cage system as recited in claim 1, wherein each of said legs include at the top thereof a protrusion which is adapted to extend through a complementary receptacle in the upper flange of said upper cross-member, said protrusion when deformed providing a locking relation between said leg and upper cross-member.

4. A poultry cage system as recited in claim 1, wherein said protrusion has a thickness substantially the same as that of the member from which it extends and said complementary receptacle is in the form of a slot adapted to receive said protrusion.

5. A poultry cage system as recited in claim 1, which further includes a trough extending across said frame members for supplying feed to the poultry, and a clip member for supporting said trough and adapted to be connected to said frame member, said clip member having a portion thereof conformed to the transverse cross-sectional shape of said trough and a projecting portion having opposed notches therein adapted to protrude into a slot in the leg of said frame member with said notches engaging said slot to provide a locking relation between said clip member and said leg, whereby a trough may be snapped into and supported by said clip member.

6. A poultry cage system as recited in claim 1, wherein said means interconnecting said frame members comprise a plurality of clip members connected to the leg of said frame member, corresponding clip members of adjacent frame members being disposed at substantially the same heights, said clip members being connected to said legs by a projection having opposed notches therein and extending into a slot provided in said leg with said notches engaging said slot, and at least one support extending between adjacent frame members and being connected to the legs thereof by said clip members, said support having a transverse cross-section substantially corresponding to the shape of said clip members whereby said support is snapped into and secured by corresponding clip members.

7. A poultry cage system as recited in claim 1, wherein said means for supporting the cages from said frame members includes projections extending from said cross-members which are engaged with said cages disposed adjacent said cross-members, and which further includes first wire means interconnecting adjacent cages and second wire means extending between adjacent frame members for engaging and supporting a cage disposed intermediate said cages located adjacent said cross-members.

8. A poultry cage system as recited in claim 1, and further including a feed system therefor including at least one bracket having a protrusion extending therefrom which is adapted to be received in a complementary slot provided in said frame member, said bracket being connected to said frame members at the top thereof by rotating said protrusion portion extending through said frame member, and means secured to said bracket for housing feed.

9. A poultry cage system as recited in claim 1, wherein said at least one lower cross-member has opposed ends and includes a planar surface on at least one side thereof adjacent each said end, and at least one protrusion transversely extending from each of said planar surfaces, each of said legs having a receptacle through which a respective protrusion on said lower cross-member is adapted to extend, each said protrusion when deformed providing a locking relation between said leg and said lower cross-member.

10. A poultry cage system comprising a plurality of spaced frame members, means interconnecting said frame members to one another, a plurality of rows of cages for housing said poultry extending between said frame members and means for supporting the cages from said frame members, said frame members each including a pair of upright legs, an upper cross-member and at least one lower cross-member extending between and connected to said legs, said lower cross-member having opposed ends and including a planar surface on at least one side thereof adjacent each said end and at least one protrusion transversely extending from each of such planar surfaces, each of said legs having a receptacle through which a respective protrusion on said lower cross-member is adapted to extend, each said protrusion when deformed providing a locking relation between said leg and lower cross-member, and locking means for securely connecting said upper cross-member and legs including a protrusion extending from the surface of one of said upper cross-member and said legs and a complementary receptacle in the other for receiving said protrusion in a locking relation when such protrusion is inserted therein.

11. A poultry cage system comprising a plurality of spaced frame members, means interconnecting said frame members to one another, a plurality of rows of cages for housing said poultry extending between said frame members and means for supporting the cages from said frame members, said frame members each including a pair of upright legs, an upper cross-member and at least one lower cross-member extending between and connected to said legs, said upper cross-member being connected to said legs proximate the tops thereof and including a longitudinally-extending upper flange on the upper side thereof and a longitudinally-extending lower flange on the lower side thereof, said lower flange of the upper cross-member having an opening therein through which said legs extend for a length sufficient for abutting said leg against the upper flange, and locking means for securely connecting said cross-members and legs to form said frame, said locking means including a protrusion extending from the surface of one of said members and a complementary receptacle in the other of said members for receiving said protrusion in a locking relation when said protrusion is inserted therein after assembly, each leg of said frame member being identical and including a substantially planar center portion, a flange extending along each side adjacent to said center portion and a projection extending from each flange at the top of said leg, the upper center portion of said leg being in a V-shaped such that when said legs are inclined toward one another, one side of said V-shaped top is abutting against the upper flange of said upper cross-member and a projection extends through a complementary receptacle in the upper flange member, the projections being deformed to interlock said legs and upper cross-member.

12. A poultry cage system as recited in claim 11, wherein each leg has the bottom portion thereof in a V-shaped configuration so that one side of said V-shaped bottom is in contact with a floor surface when supporting the cage system.

13. A poultry cage system as recited in claim 11, wherein each said projection extending from each said flange at the top of said leg is essentially the same thickness and substantially the same width as the respective flange from which it extends.

* * * * *

UNITED STATES PATENT AND TRADEMARK OFFICE
CERTIFICATE OF CORRECTION

PATENT NO. : 4,195,592
DATED : April 1, 1980
INVENTOR(S) : Anthony J. Siciliano

It is certified that error appears in the above—identified patent and that said Letters Patent is hereby corrected as shown below:

Column 1, line 49   - change "in" to --of--

Column 4, line  6   - change "flushy" to --flushly--

Column 5, line 66   - after "from" insert --the--

Column 7, line 25   - before "lower" insert --said--

Signed and Sealed this

Eighth Day of July 1980

[SEAL]

Attest:

SIDNEY A. DIAMOND

*Attesting Officer*   *Commissioner of Patents and Trademarks*